July 3, 1962   W. W. JOHNSON ET AL   3,042,497
CO₂ SCRUBBER
Filed March 9, 1959
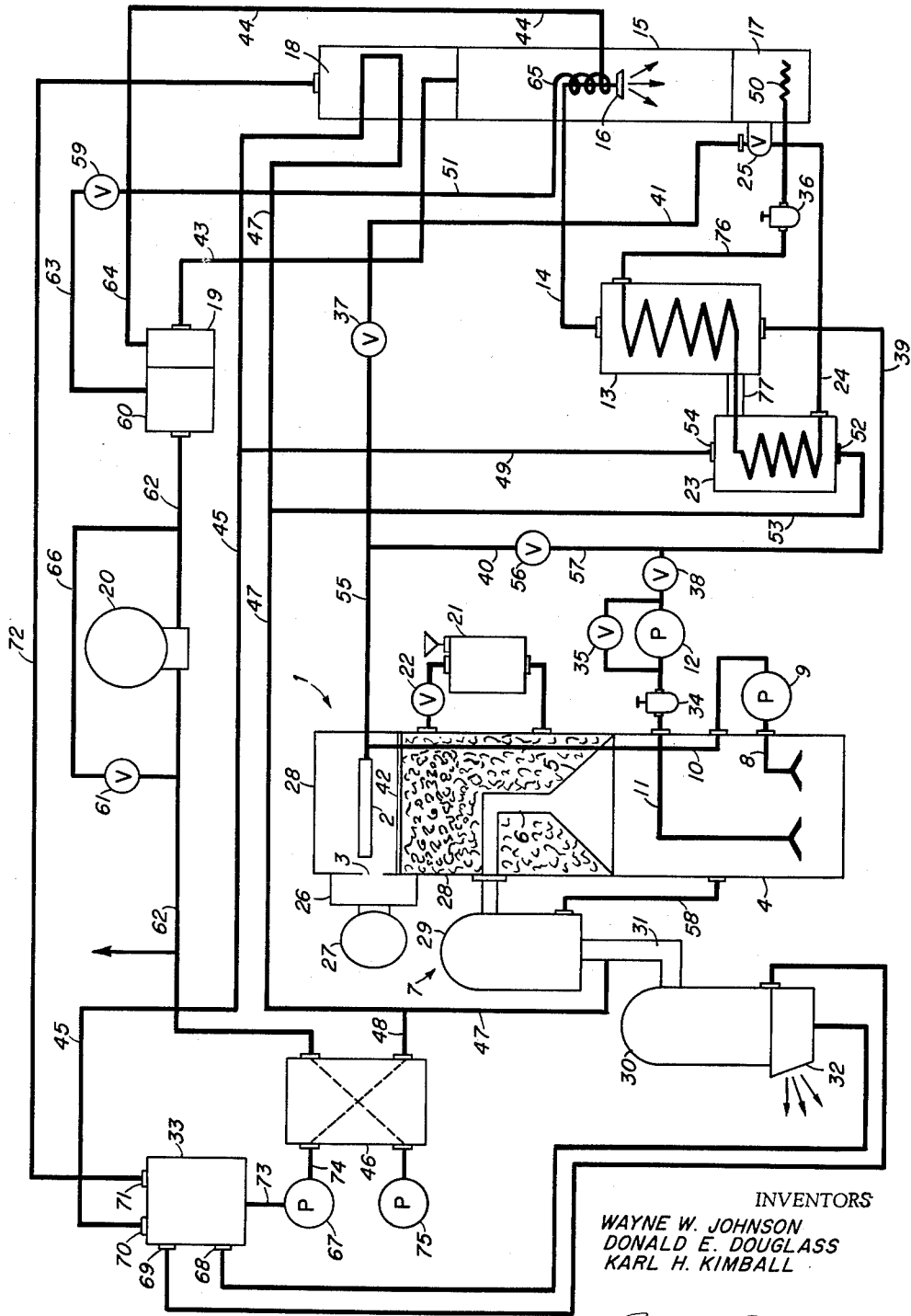
INVENTORS
WAYNE W. JOHNSON
DONALD E. DOUGLASS
KARL H. KIMBALL
Paul N. Critchlow
ATTORNEYS

United States Patent Office 3,042,497
Patented July 3, 1962

3,042,497
CO₂ SCRUBBER
Wayne W. Johnson, Vallejo, Karl H. Kimball, San Francisco, and Donald E. Douglass, Napa, Calif., assignors to the United States of America as represented by the Secretary of the Navy
Filed Mar. 9, 1959, Ser. No. 798,309
3 Claims. (Cl. 23—260)
(Granted under Title 35, U.S. Code (1952), sec. 266)

The invention described herein may be manufactured and used by or for the Government of the United States of America for governmental purposes without payment of any royalties thereon or therefor.

This invention relates to a device for treating a stream of gas, and more particularly, to the removal of a component from such a stream.

Various means and processes have been utilized to accomplish the removal of an undesirable component of a gas from a major stream of gas. Basically, these treating mechanisms employ towers, namely, a stripping and an absorbing tower, wherein both contain some aqueous solution for treating the gas. Generally, the aqueous solution comprises an absorbing compound and a liquid that absorbs a portion of the component, part of which is in turn directed to the stripping tower which removes the undesirable component therefrom. The unwanted component is then condensed and discarded. The particular type of absorbing solution, and the temperature thereof, has varied as does the ultimate amount of component removed as to parts per million (p.p.m.).

Such basic structures or plants, generally referred to as scrubbers, utilize various processes for removing the unwanted component from the major stream. One process utilizes water to accomplish the task of removing a component gas, such as carbon dioxide, from a major stream. Such removal by water is followed by a chosen aqueous absorbing action.

Another process involves the use of a suitable substance such as hot potassium carbonate which is used to extract the bulk of the foreign or unwanted component gas and that remaining is removed by chemically combining it with a solution that is used to further treat the gas, and then the component gas is stripped from the solution in some other conventional manner.

Still another process involves the use of a caustic scrubbing unit which is included in the treating ssytem to reduce the proportion of foreign or component gas to a level where the basic components of the plant can be utilized to reliably complete the separation.

Such plants or scrubbers, when employed to remove carbon dioxide, are called $CO_2$ scrubbers and, for example, are used to remove the carbon dioxide from the atmosphere within a submarine. As known, the atmosphere within a submarine is replete with carbon dioxide due to the personnel populating the confines thereof. Hence, plants which operate efficiently are vital to the personnel of a submarine. Further, since space within a submarine is a prime factor, a plant that is conserving in respect to space is important.

Previous treating plants have utilized various articles such as aluminum rings or ceramic objects to reside in the absorbing aqueous solution, thereby providing a larger contact area for the mixture of solution and gas being treated. In many instances, the material of the metal rings enters into a chemical reaction with the solution and gas and such reaction becomes deleterious to operation. On the other hand, when carbon rings or ceramic objects, such as saddles, are used for this purpose, a hard, gritty substance is formed in the towers.

Since the atmosphere within a submarine necessarily must be substantially pure of foreign gases so the personnel will have suitable living conditions, it becomes mandatory that the air be substantially devoid of such foreign gas, such as carbon dioxide.

Therefore, an important object of the invention is to provide a means for treating gas which requires a relatively small space but which functions at high efficiency.

Another object is to provide a gas treating plant wherein the movement and stripping flow rate is increased to achieve the greatest profitable carbon dioxide removal rate.

One other object is to provide a gas treating plant which operates with a minimum of structure, and therefore is conservative of space.

A further object is to provide a gas treating plant which effects a large degree of contact between the gas being treated and the treating substance, which affords no deleterious operation thereby.

According to this invention, the basic essentials of an absorbing tower and stripping tower are provided. The absorbing and stripping towers are gravity fed and contain metal shavings along with an absorbing aqueous solution. The metal shavings provide an extensive area for the incoming gas and absorbing solution to come into contact. The absorbing solution takes up gas under one set of conditions and relinquishes it under another and the two towers provide differing conditions for the solution and incoming air. The absorbing tower functions to absorb the component gas and the stripping tower functions to relinquish the component or foreign gas. The absorbing tower and stripping tower are interrelated with an air purifying mechanism as well as a fresh water and sea water system. The air purification mechanism is also interrelated with the other systems of the treating plant and it is this air purifier that utilizes the fresh water and sea water systems.

The major gas stream under treatment is introduced into the top of the absorbing tower which has a suitable solution, preferably monoethanolamine (MEA), and metal shavings contained therein, in and through which the gas under treatment is gravity fed. One feature of the treating plant is that the absorbing solution so utilized, when in a relatively cool physical state, readily absorbs the component or unwanted gas, but while in a relatively hot state, gives up a portion of it. The absorbing solution is in a cool state while in the absorbing tower and therefore absorbs the unwanted component once again. A relatively small, but somewhat critical, portion of the absorbing solution is pumped or delivered to the stripping tower where there the unwanted component is separated from the major stream of gas and is directed into a condenser, water separator, and compressor, for eventual discharge. Having stripped the major stream of gas, which is being carried by the absorbing solution, of the unwanted component, the solution is now clean and is redirected to the absorbing tower. After a series of successive recycling of the absorbing solution, the major stream of gas becomes "cleansed" but is not considered sufficiently clean to be utilized by personnel within the area. The "cleansed" gas, namely, air if the plant is being used in a submarine, is in the lower or sump portion of the absorbing tower and is then directed into the air purification system. Such purifier comprises first and second stage separators that have a somewhat critical supply of sodium bisulfate solution therein, and a fresh water cooler and a sea water supply delivered thereto. On emergence of the major stream of the gas (namely air in this substance) air suitable for breathing, and substantially free of carbon dioxide, is obtained.

Other objects and many of the attendant advantages of this invention will be readily appreciated as the same become better understood by reference to the following detailed description considered in connection with the accompanying drawing:

The drawing shows an embodiment of this invention, indicating the basic structure that may be employed.

The drawing indicates the scrubber structure wherein a "lean" solution is introduced into the absorbing tower 1 through spray nozzles 2 located in the upper portion thereof. A gas stream is introduced by an inlet 3 into the tower. In the tower's lower portion a sump 4 is provided, which is separated from the upper part by baffle 5 having its usual perforations (not shown) and conduit 6 that permits the travel of "cleansed" gas into the air purifying mechanism generally indicated by reference numeral 7. The major portion of the rich solution is recycled through pipe 8 which permits the solution to pass into a pump 9 located beyond the tower which directs the recycled solution back to spray nozzles 2 through line 10. However, a relatively small portion passes through line 11 into stripping pump 12 which directs that portion of the solution to heat exchanger 13 from whence it is directed through line 14 and stripping tower 15. The incoming solution passes into spray head 16 which, as in the absorbing tower, is gravity fed through the tower to boiler 17 which causes the solution to release the foreign or unwanted component of the gas as well as water, and a portion of the solution itself, and which converts them into vapor form. The vapor gas passes in the tower to condenser 18, located in the upper part of the stripping tower, from which it proceeds to water separator 19 and through compressor 20 for eventual discharge. The make-up tank 21 is utilized in conjunction with the absorber tower 1 and is connected thereto by suitable pipes and valve 22. The tank and its valve function to equalize the pressure within the absorbing tank and the incoming solution. The remaining "clean" solution is redirected into the absorbing tower through the heat exchanger 13, into a cooler 23, and on through pipe 24 to a regulator valve 25 which controls the level liquid in the reboiler. The lean solution is then directed into absorbing tower 1. The cool, fresh water system which will be discussed subsequently, is employed for various purposes, namely, to supply the heat exchange cooler with cool fresh water, to supply a medium for cooling and condensing the gases within the above mentioned condenser, and to aid in the action of air purification. The sea water system is utilized to cool the fresh water system.

The scrubber is characterized by a cool solution that readily absorbs the foreign or unwanted component of a gas, such as carbon dioxide, from a major stream of gas, thereby becoming "rich." In the contrary condition, namely, hot, the solution gives up the component and thus becomes "lean." The particular type of solution employed is dependent on one primary or major factor, namely, that which brings or effects the capacity of the treating device to a maximum possible value. One other factor to be considered is that in some instances the residual vapor of the solution is difficult for humans to tolerate, and hence, a vapor that is the easiest to tolerate will be the most suitable. Therefore, monoethanolamine (MEA), which is a chemical compound derived from an ammonia base, is preferably employed as the absorbing compound. The MEA compound is placed in water to create an aqueous solution and the ratio of compound to water is dependent upon what renders the most favorable conditions, preferably one part compound to three parts water. Experience indicates that the absorbent solution will degrade upon use but its rate of degradation will be lessened by the addition of a substance. Experience also indicates that a 1% solution of potassium iodide is preferable for this purpose. In addition, anti-foam may be added to each tank solution to a suitable extent, such as one fluid ounce per tank. The MEA solution is introduced into a pipe leading from a tank outside the tower into the lower sump portion of the tower. The recycle pump 9 draws the solution from sump 4 and moves it to the top of the tower where it is discharged through spray nozzles 2.

A major stream of gas, such as air, from the surrounding atmosphere, may be directed into the absorbing tower 1 by a suitable blower or compressor 26 mounted thereover which in turn has an air silencer 27 mounted thereon that functions to minimize the sound of the gas being drawn into the system. Upon entrance of the gas stream to the tower, it mixes with the absorbing solution and shavings or metal chips whereby the unwanted gas component, such as carbon dioxide, is taken up. The blower acts to move the stream of gas from the surroundings into the absorbing tank or tower and may be of any suitable size depending on the size of the plant, such as 2 horse power motor operating at some 1700 r.p.m. The absorbing tower 1 is separated into two sections, namely, the upper portion and the lower or sump portion 4, by baffle 5, and the absorbing solution and absorbed component continues to pass through the metal shavings into the sump 4. As indicated, both the absorbing and stripping towers are gravity fed and contain the metal shavings which provide an extensive area for the incoming gas and absorbing solution to come into contact. The use of these metal shavings in lieu of articles such as aluminum rings or ceramic objects which reside in the aqueous absorbing solution, is considered an important feature of the invention since the shavings are light in weight and since they don't enter into a chemical reaction with the absorbing solution or the gas, thereby becoming deleterious to operation. Further, no hard, gritty substance is formed in the towers. The elimination of weight is significant since weight factors are a prime factor in submarines.

The upper section 28 of tower 1 contains spray nozzles 2 which preferably consist of some five one-inch spray heads positioned over a five mesh screen which extends from wall to wall to the tower. Section 28 contains a suitable amount of metal shavings such as a three foot layer located below the screen, as indicated by numeral 42, and a one foot layer in the sump portion (not shown). The absorbing tower may be of any convenient size depending on the size of the plant and in this instance, it may be some six feet high, and two feet square. The metal shavings as shown in the drawing are less than a three foot layer but any desirable amount may be utilized depending upon the extent of contact deemed necessary. The stock of material the tower 1 is made of should be sturdy, preferably corrosion resistant steel, which substantially enters into no chemical reaction with the solution. The proportioning of the tower into the upper section 28 and lower section 4 depends largely upon the necessary capacity needed in the sump portion 4 and hence such portion may involve a suitable magnitude such as 35 gallons.

One feature of the invention lies in the amount of percent of the rich solution coming into sump portion 4 of tower 1, that is, recycled through pump 12, stripping tower 15, and back to tower 1. The percentage involved is dependent upon the amount that stripping tower 15 can efficiently handle. Experimental research has indicated that a small amount of the rich solution, preferably about 3%, should be drawn through the recycle system to the stripping pump 12 which in turn directs the solution to the heat exchanger 13 imparting heat to the "rich" solution, thereby raising its temperature and directing it to the stripping tower 15 where it enters the top of spray head 16 where it is gravity fed into the stripping tower interior over metal shavings therein and on to the reboiler portion 17. The heating elements of the reboiler 17 heat the "rich" solution to a boiling point causing it to release the undesired portion of the gas.

Although a small percentage of the absorbing solution containing the major gas stream therein is directed to the stripping tower 15, the major portion thereof is directed to spray heads 2 of tower 1. The basic structure involved is a suitable pipe 8, recycle pump 9, which draws solution from the absorbing tower 1, and which may be driven by some suitable motor, such as the main motor, and of a suitable kind such as a horizontal centrifugal type of about ⅙ horse power moving at 1000 r.p.m., thereby delivering some 1800 gallons per hour which directs or draws solution from the absorbing tower through line 8 into line 10 to the spray heads 2.

The recycle system which directs absorbing solution to stripping tower 15 also supplies fluid to tower 1. This circulation system comprises a stripping pump 12, pump supply filter 34, relief valve 35, heat exchanger 13, which has fluid or liquid delivered thereto via line 39, and stripping tower 15 which has line 14 connected thereto to carry the liquid from the heat exchanger 13 to it. Stripping pump supply filter 34 is located in the absorbing solution line between the tower 1 and stripping pump 12, and functions to remove solids collected in the line that are deleterious to operation. Stripping pump 12 is connected to flexible line 11 that extends into the sump portion 4 of the absorbing tower 1 and flexible line 39 attached to the heat exchanger 13. Pump 12 is driven in some convenient manner, such as by the main motor and is of suitable size such as ⅕ horse power moving at 1750 r p m., thereby carrying some 75 gallons per hour at 80 p.si.g. The small ½ inch spring loaded relief valve 35 is connected in parallel with a stripper pump 12 so that one side receives the rich incoming solution and the other is connected to the outgoing solution from the pump. Such valve may be set at a predetermined value, such as 105 pounds per square inch (p.s.i.g.), to automatically operate and protect the enriched solution from excessive pressure. Between stripping pump 12 and heat exchanger 13 a suitable flow control valve 38 of suitable type is positioned. The liquid is directed by stripping pump 12 through a suitable flexible line 39 which carries the fluid to heat exchanger 13.

Heat exchanger 13 primarily consists of some preferable type of stack assembly of suitable size, such as 17 inches long, 12 inches wide, 9 inches in depth, and is covered by insulation. The size of this exchanger is dependent upon the amount of solution that will pass therethrough and the space available, the first factor being of primary importance. Single paths of longitudinal flow or "rich" solution is permitted through openings provided within the exchanger, whereas multiple lateral flow of "lean" solution is permitted through openings in the path heads of the exchanger. As indicated, the "cool" enriched solution comes from the stripping pump 12 through line 39 to the exchanger and the "hot" lean outlet connects to the stripping tower spray head 16 by line 14.

As in absorbing tower 1, the solution having the major gas contained therein is gravity fed from spray head 16 of stripping tower 15 over the metal shavings to the reboiler portions 17 in the bottom thereof. Heating elements 50 of the reboiler 17 heat the "rich" solution to a boiling point causing it to release the undesired component portions of the gas. The solution, now "lean" in undesired component gas, is returned to the heat exchanger 13 where heat is transferred to it. Such solution is carried through line 76 having heat exchange filter 36 therein. The "lean" solution, which is now considered regenerated, is then returned to the absorbing tower 1 by an inlet therein and the enriched discharge solution from the stripping pump 12 is directed to the same inlet via lines 57, 40, and 55, having a suitable flow control valve 56 therein. One notable feature is that the cooled solution from the cooler 23 does not pass directly to the absorbing tower 1 but instead is carried by a suitable line 24 to a regulator valve 25 which acts to control the liquid level in the reboiler portion 17 of tower 15 and thereby avoids "flashing" in the line.

The transfer and solution flow rate of exchanger 13 is of a convenient magnitude, preferably about 40,000 B.t.u.'s per hour and one gallon per minute. Further, the rate of heat exchange is of some preferable rate of about 100 degrees Fahrenheit for the incoming enriched solution and some 258 degrees Fahrenheit for that going to the spray head 16, of stripping tower 15. On the other hand, the "lean" solution, coming from the stripping tower 15 enters at about 270 degrees Fahrenheit and leaves at some 112 degrees Fahrenheit. The magnitude of the exchange of heat energy by this heat exchanger 13 is significant since the amount of heat energy imparted to the absorbing solution is significant in that it lessens the load placed upon the reboiler portion 17 of tower 15. Various thermometers may be installed at suitable points in the various lines to indicate the desired temperatures.

The absorbing solution cooler 23, preferably is also a stacked assembly of corrosion resistant steel having multipass, lateral flow heads for the "lean" solution, and multipass single pass longitudinal flow heads for the fresh water solution which is provided by openings in the single pass head. Such cooler preferably has a heat transfer rate of some 4300 B.t.u.'s per hour Some half gallon per minute of "lean" absorbing solution will enter the cooler of the preferred embodiment shown in the drawings from heat exchanger 13 at 112 degrees F., and leaves at about 95 degrees F. The fresh water solution enters the cooler 23 from tank 46 at about 90 degrees F. and leaves at some 100 degrees F., circulating at about a gallon per minute.

Float valve 25 is installed in the reboiler section of the stripping tower for controlling the liquid level therein. It is made in two parts, namely, an external housing and an internally installed float assembly. The external housing includes inlet and outlet connections, the inlet is connected by line 24 to the cooler 23 and the outlet is attached to the spray head 2 of absorbing tower 1 by lines 41 and 55. The float portion may have a suitable rod for activating the needle assembly within the flow lines 24, 41. Hence, when the liquid level within the reboiler portion falls below a certain level, the float actuates the needle to prevent "lean" absorbing solution from leaving the reboiler, thus permitting the solution level to build up in the reboiler 17. In contrast, when the liquid level is sufficiently high, the float operates to permit a flow into the "lean" absorbing solution line. To provide means for bleeding the line, a flow control valve 56 may be installed in line 40 similarly to valve 37 which is used in "lean" absorbing solution line 41 to control the flow therein. Both valves are needle types having orfices of approximately ½ inch.

As may be noted by the drawing, cooler 23 is connected to heat exchanger 13 by a suitable line 77 and to a fresh water expansion tank 33 by lines 49 and 45 which is permitted by an outlet 54, and also to fresh water tank 46 by an outlet 52 which is connected to the fresh water cooler by lines 53, 47, and 48.

The stripping tower 15 of the plant is made into some convenient size and shape, such as 6 feet high and 11 inches in diameter. It involves three sections, namely, the top or condenser section 18, the center section having spray head 16 and the metal shavings or chips, and the lower or reboiler section 17 having a plurality of heating elements 50. The condenser section may be, and as a practical matter is, flanged and bolted to the main body of the stripping tower and is connected to the water separator tank 19 by lines 43, 44, to fresh water expansion tank 33 by a continuous vent connection and outlet line 45, to a fresh water cooler 46 by lines 47 and 48, and to cooler 23 by lines 45, 49 and outlet 54. The center section receives inlet line 14 which connects spray head 16 to heat exchanger 13 to receive "rich" solution. On direction by the stripping pump 12 of the warm solution from the absorbing tower 1 to the heat exchanger 13, the solution then flows through line 14 to the spray head 16 of the stripping tower 15 and the solution is gravity fed down through the tower. Within the tower, the enriched solution passes through the metal shavings which may be supported within the tower at two locations, namely, in a small one inch deep container in the top portion of the tower and in a three foot container where the metal shavings are loosely stacked in the lower portion. The lower or reboiler section 17 carries the heating elements 15 and sensitive tube elements (not shown) for the thermo-switch and float valve used for controlling the solution level therein. The reboiler 17 by its heating elements 50 boils the solution to effect release of the undesired component portion of the gas, water vapor, and vapor from the solution itself. The reboiler develops the temperature to an effective level of 285 degrees Fahrenheit. The rising gases are brought into close contact in the "packing" of the metal shavings so as to effect release of a portion of the undesired component of the gas in the incoming "rich" solution. In addition, the steam and solution vapors condense to some extent and the undesired component gas temperature is reduced. The continued upward movement of the vapor mixture brings it to condenser 18 at the top of the stripping tower 15 where the vapors are condensed, leaving the component of foreign gas. This latter gas flows to water separator 19 through coil 65 in the stripping tower 15 to a flow meter and to a back pressure regulating valve 59 which maintains the water separator and stripper under a suitable pressure, such as 35 pounds per square inch and then to the surge tank 60 which is connected to the inlet of the compressor 20 that carries the gas overboard at some convenient time.

The water separator 19 and surge tank 60, as shown, are connected to form a single assembly comprising some 25 inches in length, 9 inches in width and 4 inches in depth. The two tank assembly is connected by lines 43, 44, to condenser 18 and to compressor 20 by line 62. As a matter of practice, a suitable valve (not shown) may be connected to the separator tank to permit water to drain therefrom, such water being lost from the component gas while passing in transit. An external connection between the surge tank 60 and separator 19 is made by lines 63 and 64 that are connected to a back pressure regulator valve 59 which regulates back pressure in stripping tower 15. This pressure regulator valve 59 may be of some suitable type having 1/4 inch orifices and is spring loaded for a pressure setting of some 30 pounds. The undesired components of the gas being treated flows through coil 65 within the upper portion of the central section of the stripping tower 15 which raises the temperature above the dew point of the undesired component gas, thus preventing condensation. Surge tank 60 has a suitable capacity, such as 1/4 cubic foot and is provided with a valve drawing off condensate lost by the component gas during transit. Such valves (not shown) are similar to valve 59.

Compressor 20 is installed in lines 62 and 66, and may be driven by the main motor, which is not shown, and is of some suitable size, such as 18 inches long, 17 inches wide, and 11 inches high, having a suitable rating such as 1/3 horse power with a displacement of 4 or 5 cubic feet per minute at some 1200 r.p.m. The undesired component of the gas enters the compressor 20 from surge tank 60 by line 62 at some 80 degrees F. and leaves at some 300 degrees F. through a discharge line (not shown). A suitable spring loaded relief valve 61 has one side connected to the inlet of the surge tank 60 and another side attached to the discharge side of the compressor.

The air purifier begins to function where air from the surrounding atmosphere contains more than 2/10 percent of carbon dioxide or other undesired component of the main gas stream being treated. The air surrounding the treating plant containing an undesired component of the gas, such as 1.5% of carbon dioxide, is drawn therein at a suitable rate, such as 170 cubic feet per minute (c.f.m.). The air is discharged by a suitable blower and gravity fed to the tower for mixing with the absorbing solution and is discharged from the spray mechanism 2 at the top of the tower 1. As the air and absorbing solution are gravity fed downward over the metal shavings, the absorbing solution absorbs the undesired component of the gas being treated and the remaining portion of the gas stream, now virtually free of the undesired component of the gas, flows upward of the baffle 5 into conduit 6 on to the air purifying mechanism 7. The rich absorbing solution flows down into the absorber tower sump 4. In the air purifier, the air is washed with a fresh water and sodium bisulfate solution to remove the absorbing solution vapor and then is discharged into the ship's ventilation system. Basically, the air purifier comprises two cyclones 29 and 30. Conduit 6 may be of some suitable size such as 4 inches in diameter, which carries the air from tower 1 through the air purifier 7 consisting of two stages 29 and 30 interconnected by a venturi tube 31. The various stages are of some suitable type, preferably a cyclone. The space demanded by such devices may involve some 15 inches in height and a 7 inch diameter for the upper cyclone, 29, with a similar diameter with but 8 inches in height for the lower one, 30. The lower cyclone 30 may have a 2½ inch flange exhaust 32 extending therefrom, wherein the exhaust has packing, such as wire mesh, positioned therein and connected to fresh water expansion tank 33.

One important feature of the invention lies in the use of a sodium bisulfate solution in the upper cyclone 29. Fluid particles entrained in gas being fed into the air purifier are separated from the air by centrifugal force and pass through line 58 into sump portion 4 of tower 1. The venturi tube 31, which connects cyclone 29 and cyclone 30, also functions to mix the gas with the sodium bisulfate solution which washes the gas free of particles and vapor of the absorbing solution. The gas then passes into a "demisting" chamber at the lower end of the second cyclone 30 where fine particles are removed by a filter. It is then returned to the surrounding atmosphere. The "purified" gas system removes undesired components of the gas down for approximately 2/10 of 1%.

A fresh water cooler circulating system comprising a fresh water expansion tank 33, a fresh water pump 67, a sea water or fresh water cooler 46, with connecting piping to the air purifier 29, the absorbing solution cooler 23, and the condenser 18, is employed with the plant for several purposes. It functions to supply cool fresh water to cooler 23 associated with the heat exchanger 13, it cools gases within the condenser 18, and assists the air purifying system 7. The supply of cool fresh water has an acid, such as sodium bisulfate, introduced into the water expansion tank 33 by a make-up connection. The solution is directed from the cooler 23 into three interconnected pipe systems, one leading to the upper stage of the air purifier by lines 53, 47, and 48 where the fresh water solution captures the absorbing solution vapor remaining in the incoming gas being treated that enters from the absorbing tower. Another piping system involved is that after washing such gas the water is returned to the expansion tank 33 for re-use via lines 49 and 45. The third system involved leads to the condenser 18 in top of the stripping tower and liquid is circulated through a cooling coil 65 thereof, where it accepts heat from the undesired component gas passing from reboiler 17. From the condenser 18, the water is returned to the fresh water expansion tank 33 by a line 45 connected to the solution cooler 23 by line 49. Four inlet connections are provided in tank 33, two being indicated by numerals 68, 69 wherein provision is made for water drain and water return from air purifier cyclone 30, by suitable pipes as shown in the drawing. Another inlet 70 connects to the absorbing solution cooler 23 by lines 45 and 47 and yet another inlet 71 connects condenser 18 by line 72.

The sea and fresh water cooler 46 functions to cool the fresh water system by transferring a portion of the heat to the sea water, and a cooler adaptable to transfer some 19,000 B.t.u.'s per hour serves the instant purpose. Such sea water is pumped into the sea water system through a valve which leads to some suitable source, such as the sea surrounding a submarine. Such water is passed through the fresh water cooler 46 where it absorbs heat and is discharged overboard through a line that picks up the undesired component of the gas which is eventually discharged. The outlet line 48 of the sea and fresh water cooler 46 is attached to the purifier by venturi tube 31 and also the absorbing solution cooler 23 by lines 47 and 53, and to condenser 18 by line 47 which returns liquid to fresh water expansion tank 33 by line 45. A fresh water outlet 54 of cooler 23 returns the water solution to the fresh water expansion tank 33 by lines 49, 45 into inlet 70 of tank 33. The water then passes through pipe 73 to pump 67 and into cooler 46 by line 74.

The plant sea water circulation system comprises sea water pump 75 which supplies the sea and fresh water cooler 46. The pump is connected to cooler 46, by a suitable pipe and driven by the main motor. It has a capacity such as ⅓ horsepower and operates at some 3500 r.p.m. with a flow rate of some 9 gallons per minute. The inlet side of the pump (not shown) connects to the sea water source and discharges sea water circulating to the fresh water cooler and valves (not shown).

The present treating plant requires a suitable motive power, such as 440 volts, 60 cycle A.C. to drive a suitable motor of some 7.5 horsepower, and this motor is not shown. Also, a course, such as 115 volts, 60 cycles A.C., may be used to operate the indicating instruments and lights utilized throughout the system. The power sources are directed to a control panel (not shown) that supports fuses of both systems. Also, a gauge board (also not shown) supports the various gauges, thermometers, and valve controls required to operate the plant. In this respect, various lights may be used to eliminate the gauges and indicators which are adequately controlled by suitable switches. The 440 volt power source may be employed to drive not only the main motor, which is not shown, but suitable reboiler heaters of proper size, such as 2.3 kw., and number, preferably 5, that are operated by activating an electric switch on the control panel. The main power source may also be utilized to drive the blower, fresh and sea water pumps, the solution recycle pump, the stripping pump, and compressor, which all may be driven by a common pulley. The reboiler thermo-switch (not shown) having its sensitive element located in the boiler wall, is automatic and this connects the heater and motor from the main line when the temperature exceeds a specified point.

The electrical and instrumentation system of the plant comprises the main motor, the reboiler thermo-switch, the reboiler high-low level alarm system, temperature indicating components, and the panel and gauge lighting systems (none being shown). Suitable switches, thermometers, fuses, etc., may be used throughout the plant where convenient and useful. Pre-set high and low levels may be set in the reboiler section of the stripping tower and a suitable mechanism, such as an alarm system, may be utilized for indicating a departure from the levels. In addition, various indicators may be used to show rates of flow, pressures, and fluid levels at critical points throughout the flow path.

The various working parts of the plant, such as valves, tanks, pumps, piping and towers, are preferably constructed of a sturdy rust resistant material, preferably corrosion resistant steel, whenever practical. Also, flexible hoses are installed whenever an adjustment in the relative physical location of a physical structure of a component is required.

In practice, the gas surrounding the treating plant is drawn into the absorbing tower 1 by blower 3 to mix with the aqueous absorbing solution passing into the tower by spray heads 2. The absorbing solution and gas under treatment are gravity fed through tower 1 over metal shavings 42. Preferably the shavings amount to stainless steel spiral lathe turnings. The use of these shavings overcomes gritty material coming from plastic objects or carbon rings which shorten the life of pump seals, etc., and which plug up the orifices of the heat exchanger and other mechanisms. These particular shavings are considerably less weighty than, for example, stainless steel rings, and thus unnecessary weight is avoided. These shavings also provide a large contact area for the fluid stream and solution, thereby providing the desired chemical reaction required to absorb the component gas being separated from the major portion. Since the absorbing solution and fluid stream are gravity fed over the shavings, and since they provide for adequate contact, no undue power is required to move the solution and gas within the plant, nor is there a need for undue circulation of the solution. Such also is true as to the stripping tower 15 in its operation.

The fluid or gas stream under treatment will be cleansed or separated to some degree from the component gas by one passing through the tower and into the lower or sump portion 4 by traversing baffle 5. The "cleansed" fluid stream will then pass into conduit 6 to purifier 7. Fluid particles entrained in the fluid or gas are separated therefrom by centrifugal force on passing through cyclone 29. Sodium bisulfate solution may be introduced into venturi tube 31 that connects cyclone 29 and 30. This somewhat acidic solution neutralizes the absorbing solution of the absorbing tower 1 and washes the gas in the absorbing solution and separates in the second cyclone stage 30. Upon leaving the second stage, the air enters a "demisting" chamber 32 located in the lower portion of the second cyclone 30. The "purified" gas is then returned to the general surroundings. However, the major feature of the fluid stream and absorbing solution entering sump portion 4 of tower 1 and is either recycled by pump 9 through lines 8 and 11 to spray heads 2 or to heat exchanger 13 by pump 12 through lines 11 and 39 into stripping tower 15 through line 14 and spray heads 16. The solution is then again gravity fed through the stripping tower over metal shavings. The amount of fluid directed into the stripping tower, preferably amounts to approximately 3%, of that recycled into the absorbing tower. This is considered to be an important feature of the invention since it effects efficiency. The percentage of solution taken from the recycle stream is an important feature of the invention as otherwise there would be an uncontrollable and unpredictable carry-over of absorbing liquid into the excite purified gas stream if the proper portions were not used but this may be corrected by a reduction of the recycle rate and modification of the absorber sump stiffeners. Heating element 50 located in the bottom of the reboiler section 17 of the stripping tower 15 boils the "rich" solution causing it to release most of the unwanted component of the gas under treatment. The removed component, now vapor, passes up into condenser 18 where water is condensed from it. From the condenser, the foreign gas flows from water separator 19 through line 44 to coil 65 through line 51 to the compressor regulating valve 59, and on to surge tank 60 connected to compressor 20 where the component gas is compressed for eventual discharge.

The "lean" solution leaving tower 15 is returned to heat exchanger 13 by line 76 where part of its heat is transferred to incoming solution. From exchanger 13, the solution passes by line 77 to cooler 23 where it is cooled by fresh water from lines 47, 48, and 53. The cooler is also connected to the air purifier 7 by lines 48 and 42. The "lean" solution is returned to the cycle system of line 24, valve 25, and lines 41 and 55. To reduce the gradation of the absorbing solution, it has been found that a 1% solution of potasium iodide may be added thereto. Attached to absorber tower 1 is make-up tower 21. This tank functions to overcome the back pressure within the tower effected by the air purifier 7 and valve 22, also operates in this respect to release the pressure within tower 1.

Fresh water is introduced into the plant by fresh water expansion tank 33, the fresh water being mixed with an acid solution, preferably sodium bisulfate, and directed into the fresh water cooler from which it may move into three interconnected piping systems, namely, to the air purifier cyclones 29, 30, solution cooler 23, and condenser 18, but in all instances it is eventually returned to tank 33 for re-use. In turn, the fresh water is cooled by the sea water system.

It is understandable and obvious that many modifications and variations of the present invention are possible in light of the above teachings. Therefore, it is to be understood that within the scope of the matter being claimed that the invention may be practiced otherwise than as specifically described.

What is claimed is:

1. Apparatus for removing carbon dioxide from atmosphere, the apparatus being of a type employing a heat-responsive absorbent solution characterized by an ability to absorb carbon dioxide when relatively cool and to release said carbon dioxide when relatively warm; said apparatus comprising an absorption tower including atmosphere and absorbent solution inlets at its upper end, a baffle disposed medially of said tower, a bed of stream-deflecting particles between said baffle and said inlets, a bottom sump portion, and spray means communicating with said absorbent solution inlet for forcefully directing absorbent solution and said incoming atmosphere downwardly through said particle bed into said sump, said baffle having a riser conduit for receiving atmosphere from the sump, an independent air purifier communicating with said riser, means including a first pump for recirculating a major portion of said absorption solution from said sump directly back to said absorption solution inlet, an absorption solution regenerator tower, and a solution-circulating circuit communicating said regenerator tower with said absorption tower sump and with the absorption solution inlet, said regenerator including a heater disposed in its lower end for raising the solution temperature sufficiently to effect said carbon dioxide release, and said circuit including a second pump and valve means for metering the amount of absorbent solution to be regenerated, said regenerator tower heater being limited in its stripping efficiency to a minor portion of the absorbent solution and said metering pump and valve means being operable to so limit the supply of said solution to said regenerator tower.

2. The apparatus of claim 1 wherein said solution circulating circuit is formed of regeneration delivery and return lines and includes at least two heat exchangers one of which is formed by disposing said delivery and return lines in a proximate relationship, said one heater exchanger functioning to increase the solution temperature to reduce the heat requirements of the regeneration tower and to initially cool, return line solution temperature, the second heat exchanger being a second solution cooler including a portion of said return line, said return line further including a regeneration tower solution level regulator valve disposed in proximity to said tower between said second heat exchanger and said absorption tower solution inlet.

3. The apparatus of claim 1 wherein said air purifier includes first and second cyclone gas washers, a first conduit connecting the first washer with the second washer, a supply of acid washing solution for neutralizing said absorbent solution, and a second conduit communicating said supply with said first conduit for delivering said supply to said first circuit, said first conduit having a venturi-neck portion and said second conduit communicating with said neck portion whereby said acid washing solution is intimately contacted with absorbent solution passing through said first conduit.

References Cited in the file of this patent

UNITED STATES PATENTS

| | | |
|---|---|---|
| 1,470,116 | Gray | Oct. 9, 1923 |
| 1,684,740 | Mewborne | Sept. 18, 1928 |
| 1,785,365 | Seil | Dec. 16, 1930 |
| 1,942,050 | Davies | Jan. 2, 1934 |
| 2,490,840 | Shaw | Dec. 13, 1949 |
| 2,592,762 | Taylor | Apr. 15, 1952 |
| 2,716,818 | Draemel et al. | Sept. 4, 1956 |